(12) United States Patent
Zhao

(10) Patent No.: US 11,204,149 B1
(45) Date of Patent: Dec. 21, 2021

(54) SYSTEM INCLUDING ASYMMETRIC TOTAL INTERNAL REFLECTION LENS

(71) Applicant: Feng Zhao, Newburgh, NY (US)

(72) Inventor: Feng Zhao, Newburgh, NY (US)

( * ) Notice: Subject to any disclaimer, the term of this patent is extended or adjusted under 35 U.S.C. 154(b) by 0 days.

(21) Appl. No.: 16/951,127

(22) Filed: Nov. 18, 2020

Related U.S. Application Data

(60) Provisional application No. 62/903,770, filed on Sep. 21, 2019.

(51) Int. Cl.
| | |
|---|---|
| *G02B 6/00* | (2006.01) |
| *F21V 8/00* | (2006.01) |
| *F21V 5/00* | (2018.01) |
| *F21V 5/04* | (2006.01) |
| *F21V 7/00* | (2006.01) |
| *F21Y 105/10* | (2016.01) |
| *F21Y 115/10* | (2016.01) |

(52) U.S. Cl.
CPC .............. *F21V 5/04* (2013.01); *F21V 7/0091* (2013.01); *F21Y 2105/10* (2016.08); *F21Y 2115/10* (2016.08)

(58) Field of Classification Search
CPC ........ F21V 5/04; F21V 7/0091; G02B 6/0038
See application file for complete search history.

(56) References Cited

U.S. PATENT DOCUMENTS

| | | | | |
|---|---|---|---|---|
| 9,519,095 | B2 * | 12/2016 | Wilcox | ............... G02B 6/0028 |
| 10,180,529 | B2 * | 1/2019 | Ohno | ..................... G02B 6/005 |
| 10,502,899 | B2 * | 12/2019 | Wilcox | .................. G02B 6/305 |
| 2006/0050282 | A1 * | 3/2006 | de Lamberterie | ...... F21S 43/14 |
| | | | | 356/452 |
| 2014/0140084 | A1 * | 5/2014 | Zwick | ..................... B60Q 1/26 |
| | | | | 362/511 |

* cited by examiner

*Primary Examiner* — Arman B Fallahkhair

(57) ABSTRACT

The present disclosure is generally directed to lighting systems that enhance the distribution of light. As set forth herein, the disclosed embodiments can include a lighting device, such as a strip of light emitting diodes (LEDs) and an asymmetric total internal reflection (TIR) lens.

12 Claims, 4 Drawing Sheets

SYSTEM INCLUDING ASYMMETRIC TOTAL INTERNAL REFLECTION LENS

CROSS-REFERENCE TO RELATED APPLICATION

This patent application is related to and claims the benefit of priority to U.S. Provisional Application Ser. No. 62/903,770, filed Sep. 21, 2019. The disclosure of the foregoing patent application is expressly incorporated by reference herein for any purpose whatsoever.

BACKGROUND

LEDs are being employed to an ever greater extent for lighting applications due to their power efficiency and versatility. LEDs are employed, for example, in luminaires, which are stand-alone lighting units which may include one or more LED lamps or lanterns. Luminaires have been employed in traffic lighting, pathway lighting, and parking lot lighting, among other public uses. The present disclosure includes improvements over the current state of the art.

SUMMARY OF THE DISCLOSURE

In accordance with some implementations, the disclosure provides implementations of an asymmetric total internal reflection ("TIR") lens. In some implementations, the asymmetric TIR lens includes an elongate body formed at least in part of light transmissive material. The elongate body can be defined by a first elongate planar surface and a second elongate planar surface spaced from the first planar surface, wherein the first and second elongate planar surfaces define a volume of the asymmetric TIR lens. The first elongate planar surface and the second elongate planar surface can be joined by a first elongate peripheral edge. The first elongate peripheral edge can be aligned with a light source. With respect to a cross section of the asymmetric TIR lens, light can be transmitted from the light source directly into the edge and redirected, typically at an oblique angle, toward the second elongate planar surface and reflected internally back into the light transmissive material of the elongate body and out through the first elongate planar surface.

If desired, the first elongate planar surface can include an interrupted surface. The interrupted surface can be defined by a plurality of parallel ridges oriented parallel to a longitudinal axis of the asymmetric TIR lens. If desired, the elongate body be linear and/or curved, and can be loop-shaped, if desired.

In some implementations, the second elongate planar surface can extend perpendicularly away from the first elongate peripheral edge and then curve toward the first elongate planar surface. The lens can be formed, for example, from an extrusion and/or a molding of the light transmissive material.

The disclosure further provides a lighting system, such as a luminaire, that in turn includes at least one asymmetric TIR lens as disclosed herein, and a linear light source aligned toward the first elongate peripheral edge. Light generated by the linear light source passes through the first elongate peripheral edge and is redirected toward the second elongate planar surface, and is reflected internally back into the light transmissive material of the elongate body and out through the first elongate planar surface. If desired, the linear light source can include a row of LED elements, a light transmissive medium such as a fiber optic, or other light source, as desired.

In some implementations, the lighting system can be configured as a wall wash fixture or other fixture. The lighting system can be straight, wave shaped, loop shaped, and the like, as desired.

The present disclosure further discloses methods of manufacturing an asymmetric TIR lens as set forth herein, and optionally, a lighting system including the asymmetric TIR lens. The TIR lens can be formed by injection molding, press forming into a mold, or other suitable technique, preferably as a single, monolithic element. If desired, the method can further include bending the extrusion into a desired shape in a jig or template, such as a curved template, before it fully hardens after molding or extrusion. If desired, the light transmissive material can be polymeric or glass, as desired.

The disclosure further provides implementations of methods for installing a light fixture, including providing a lighting system as set forth herein, and installing the lighting system in an orientation wherein the first elongate planar surface is oriented toward a wall to be illuminated. The second elongate planar surface can accordingly be oriented toward a location where an intended observer of the wall illumination is to be located so that the intended observer is unable to discern where light from the fixture is originating from.

It is to be understood that both the foregoing general description and the following detailed description are exemplary and are intended to provide further explanation of the embodiments disclosed herein.

The accompanying drawings, which are incorporated in and constitute part of this specification, are included to illustrate and provide a further understanding of the method and system of the disclosure. Together with the description, the drawings serve to explain the principles of the disclosed embodiments.

BRIEF DESCRIPTION OF THE DRAWINGS

The foregoing and other objects, aspects, features, and advantages of exemplary embodiments will become more apparent and may be better understood by referring to the following description taken in conjunction with the accompanying drawings, in which.

DETAILED DESCRIPTION

The present disclosure is generally directed to lighting systems that enhance the distribution of light. As set forth below, the disclosed embodiments can include a lighting device, such as a strip of light emitting diodes (LEDs) and an asymmetric total internal reflection (TIR) lens. TIR lenses known in the art tend to be symmetric about a central axis and is typically aligned with a cylindrical coordinate system. The present disclosure includes implementations of a typically linear TIR lens that can be made, for example, by way of a polymeric extrusion that includes a first edge for placing along a light source, such as a strip of LEDs. The LEDs project light through the first edge of the TIR lens such that it is reflected internally off of a first side of the lens, and "bounced" out through an opposing face of a lens.

Figure 1:
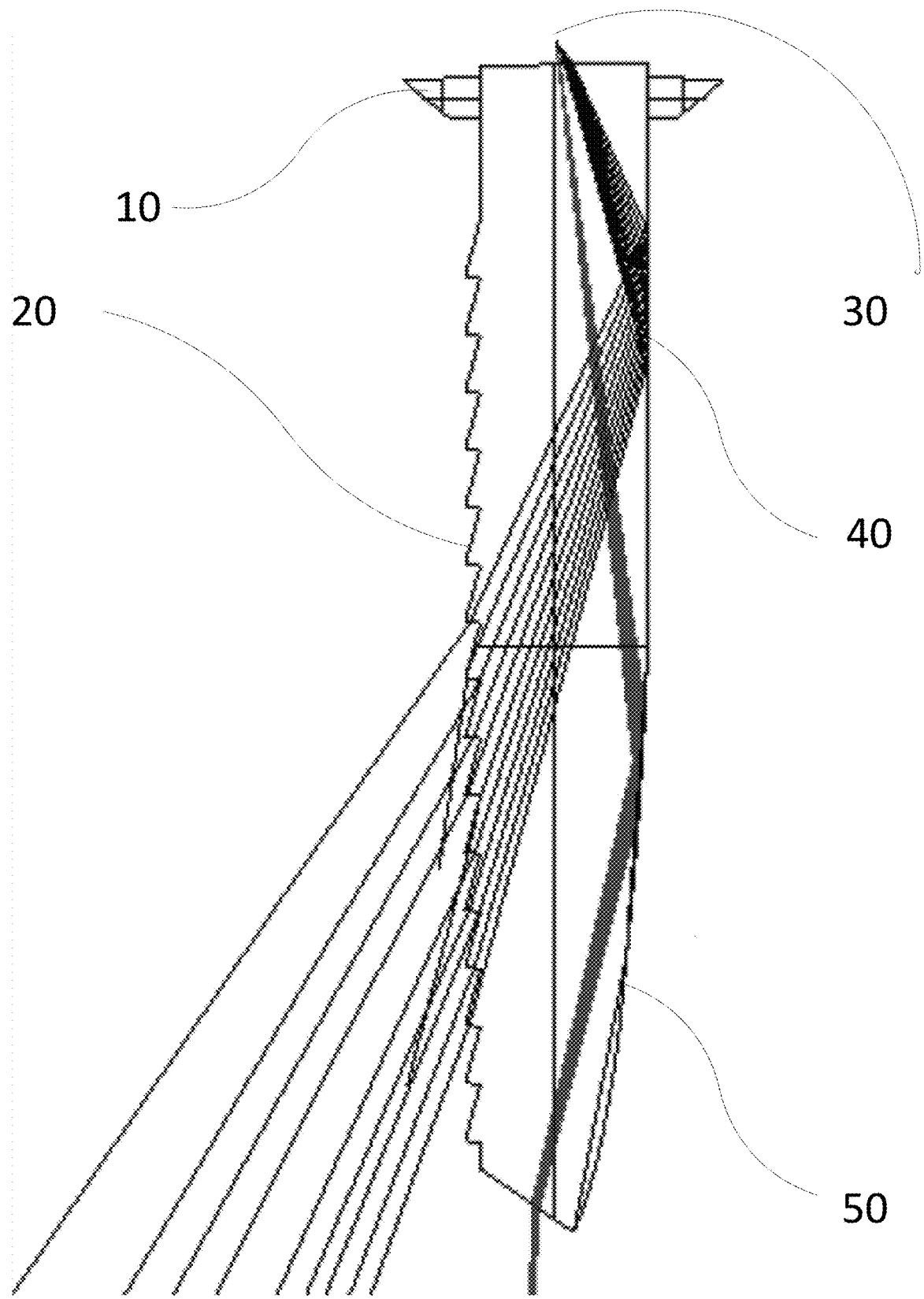
FIG. 1 depicts a cross section of an asymmetric TIR lens in accordance with the present disclosure.

For purpose of illustration, and not limitation, FIG. 1 depicts a schematic of a cross section of an asymmetric TIR lens in accordance with the disclosure. As depicted, the asymmetric TIR lens typically includes a solid, elongate body formed at least in part of light transmissive material, such as a polymer or glass material. As illustrated, the elongate body can be defined by a first elongate planar surface 20 and a second elongate planar surface 40 spaced from the first planar surface, wherein the first and second elongate planar surfaces define a volume of the asymmetric TIR lens. The first elongate planar surface 10 and the second elongate planar surface 20 are illustrated as being joined by a first elongate peripheral edge 30. The first elongate peripheral edge 30 can be aligned with a light source that can direct light directly into the edge 30 along a cross sectional axis along a direction toward a tip of the lens.

With continuing reference to FIG. 1, a computer-generated ray diagram shows the propagation of light through the asymmetric TIR lens when introduced into edge 30. Thus, the light passes through this edge 30, which can be thought of as a first, "upper" wall that either abuts or is at least proximate the light source. The incoming light then traverses through the material of the lens, where it is internally reflected by a second, downwardly depending wall (second elongate planar surface 40), which is illustrated as being the right side of the cross section of the lens in FIG. 1. Wall 40 is illustrated as extending obliquely or orthogonally, as desired with respect to the first, or upper wall 30 that faces the light source. The internally reflected light, depicted by the ray diagram then passes toward the left side of the cross section of the lens of FIG. 1 (first elongate planar surface 20), which can include a serrated or other pattern to help distribute the light. Thus, with respect to the illustrated cross section of the asymmetric TIR lens, light can be transmitted from the light source directly into the edge and redirected, typically at an oblique angle, toward the second elongate planar surface and reflected internally back into the light transmissive material of the elongate body and out through the first elongate planar surface. As further depicted in FIG. 1, the cross section can have a curved portion 50 that transitions from the straight edge 40 to help bend light to exit a distal end region of the lens. Feet 10 can be provided to help to anchor the lens into a luminaire.

Figure 2:
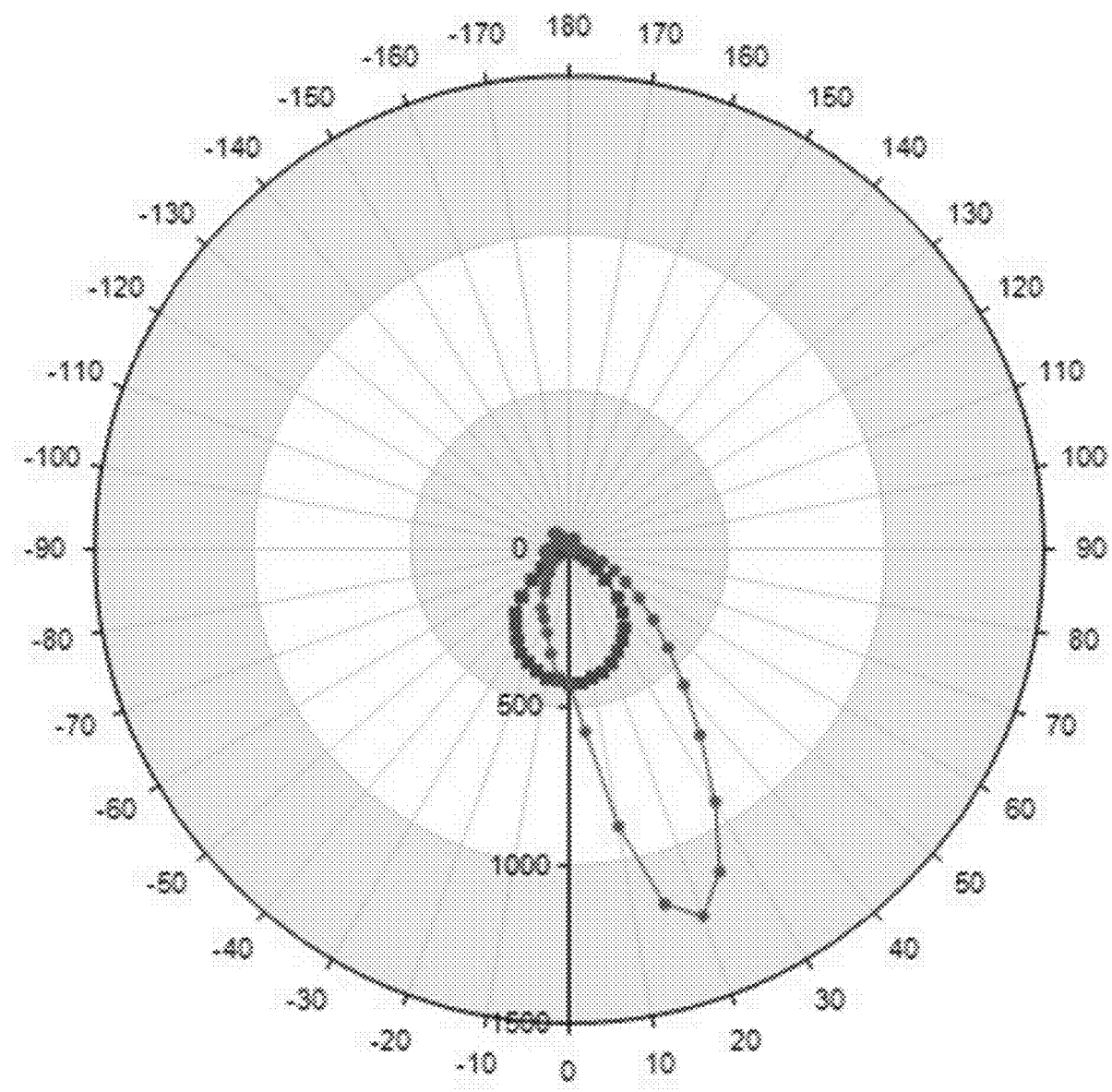
FIG. 2 depicts a computed light distribution plot of an illustrative TIR lens similar to that illustrated in FIG. 1.

FIG. 2 is a computer generated plot of the cross section of the lens in FIG. 1 showing the light distribution of the illustrated asymmetric TIR lens. As one can surmise, very little of the light generated by the light source passes through surfaces 40 or 50 of the lens of FIG. 1.

Figure 3:
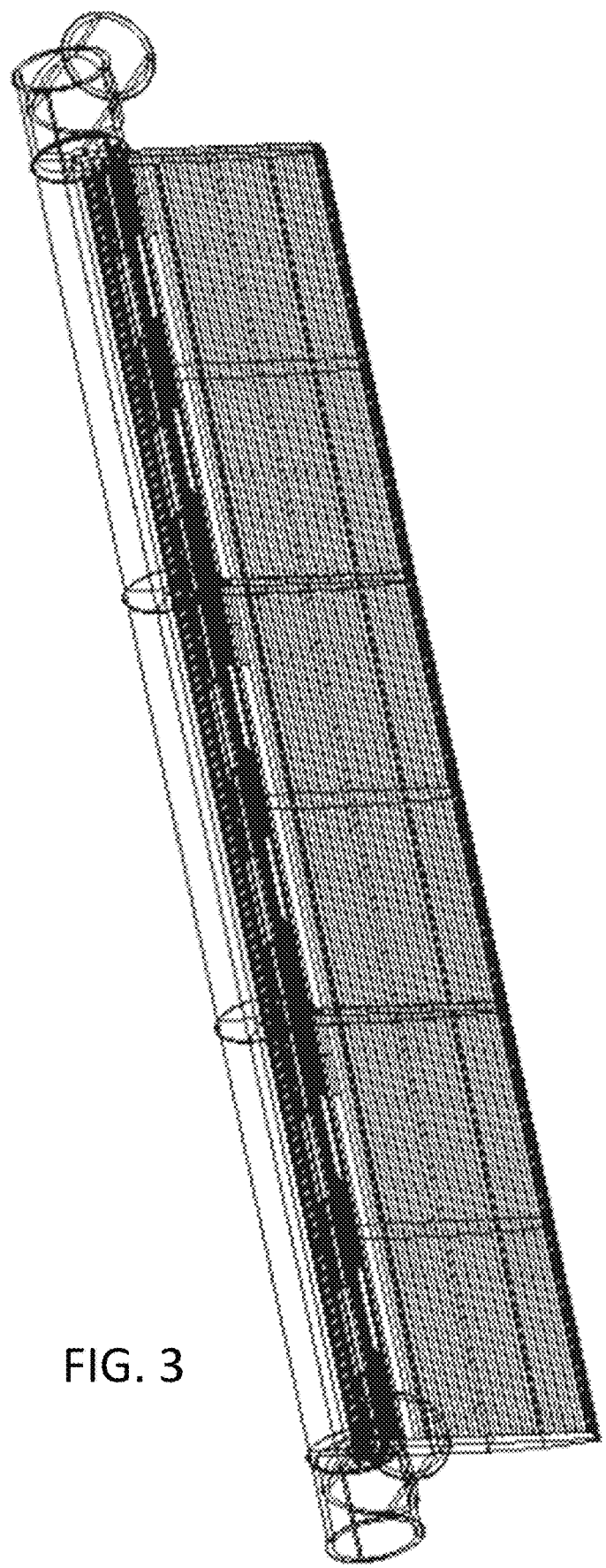
FIG. 3 depicts an isometric view of a luminaire incorporating the asymmetric TIR lens of FIG. 1 in accordance with the present disclosure.
Figure 4:
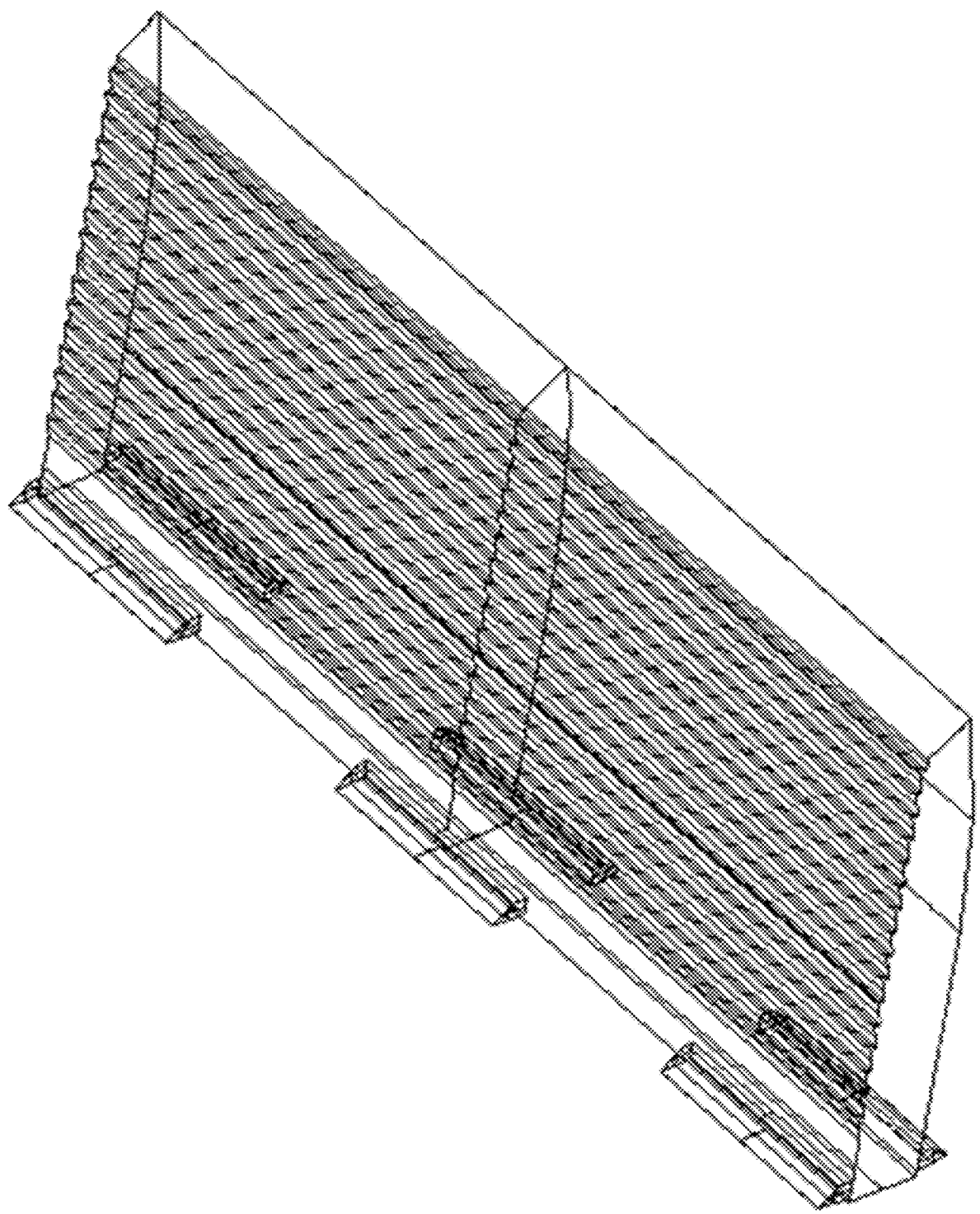
FIG. 4 depicts an isometric view of a prototype asymmetric TIR lens in accordance with the present disclosure.

As alluded to above, the first elongate planar surface can include an interrupted surface. As illustrated in FIGS. 1, 3 and 4, the interrupted surface can be defined by a plurality of parallel ridges oriented parallel to a longitudinal axis of the asymmetric TIR lens. If desired, the elongate body be linear and/or curved, and can be loop-shaped, if desired.

With reference to FIG. 3, the disclosure further provides a lighting system, such as a luminaire, that in turn includes at least one asymmetric TIR lens as disclosed herein, and a linear light source aligned toward the first elongate peripheral edge. Light generated by the linear light source passes through the first elongate peripheral edge and is redirected toward the second elongate planar surface as illustrated in FIG. 1, and is reflected internally back into the light transmissive material of the elongate body and out through the first elongate planar surface. If desired, the linear light source can include a row of LED elements, a light transmissive medium such as a fiber optic, or other light source, as desired. Such a lighting fixture can be used in a "wall wash" application to illuminate a wall.

As depicted in FIG. 4, the illustrated TIR lens can be linear in shape, but it will be appreciated that the disclosure includes modifications to this device. For example, rather than being a straight lens that lays along a straight, linear LED light source, the lens can be wavy or curved, for example to match a predetermined radius for placement along a curved wall. In some implementations, the lighting system can be configured as a wall wash fixture or other fixture. The lighting system can be straight, wave shaped, loop shaped, and the like, as desired. The lens or may also be curved to surround a volume and be annularly shaped, for example, ovoid, triangular, serpentine, and the like so as to direct light radially outwardly or inwardly, depending on the geometry. The LED strip or other light source can accordingly be shaped to be ring shaped, or curved, or serpentine shaped to follow the shape of the lens.

The present disclosure further discloses methods of manufacturing an asymmetric TIR lens as set forth herein, and optionally, a lighting system including the asymmetric TIR lens. The TIR lens can be formed by injection molding, for example. Thus, the lens can be formed into any desired shape. In the implementation of FIGS. 1 and 4, a plurality of feet 10 are molded into the lens, and can take on any desired shape. The feet (or a ridge, for example) molded into the lens in that location can be used to hold the lens in place. If desired, the light transmissive material can be polymeric or glass, as desired.

The disclosure further provides implementations of methods for installing a light fixture, including providing a lighting system as set forth herein, and installing the lighting system in an orientation wherein the first elongate planar surface 20 is oriented toward a wall to be illuminated. The second elongate planar surface 40 can accordingly be oriented toward a location where an intended observer of the wall illumination is to be located so that the intended observer is unable to discern that light from the fixture is originating from the first elongate planar surface 20.

The devices and methods disclosed herein can be used for other purposes as illustrated or can be modified as needed to suit the particular application. In view of the many possible embodiments to which the principles of this disclosure may be applied, it should be recognized that the illustrated embodiments are only preferred examples of the disclosure and should not be taken as limiting the scope of the disclosure.

What is claimed is:
1. A luminaire comprising:
a linear light source including a row of LED elements; and
an asymmetric TIR lens comprising an elongate body formed at least in part of light transmissive material, wherein:
the elongate body is defined by a first elongate planar surface including a plurality of light redirecting elements formed therein and a second uninterrupted elongate planar surface having a flattened portion that transitions into a curved portion, the second uninterrupted elongate planar surface being spaced from the first elongate planar surface, wherein the first and second elongate planar surfaces define a volume of the asymmetric TIR lens;
the first elongate planar surface and the second elongate planar surface are joined by a first elongate peripheral edge, wherein the row of LED elements are configured to direct light into the first elongate peripheral edge of the asymmetric TIR lens;

light transmitted through the asymmetric TIR lens from the row of LED elements is reflected internally by the flattened portion and the curved portion of the second uninterrupted elongate planar surface so that substantially all of the light transmitted from the row of LED elements is transmitted outwardly through the first elongate planar surface and redirected by the plurality of light redirecting elements located at the first elongate planar surface to distribute illumination over a surface to be illuminated; and the second uninterrupted elongate planar surface extends away from the first elongate peripheral edge and then curves toward the first elongate planar surface in the region of the curved portion of the second uninterrupted elongate planar surface, and the curved portion of the second uninterrupted elongate planar surface is defined by an outer convex surface that internally reflects light from the row of LED elements toward the first elongate planar surface.

2. The luminaire of claim 1, wherein the plurality of light redirecting elements form an interrupted surface.

3. The luminaire of claim 1, wherein the asymmetric TIR lens is formed from a molding of the light transmissive material.

4. The luminaire of claim 3, wherein the light transmissive material is polymeric.

5. The luminaire of claim 3, wherein the light transmissive material includes glass.

6. The luminaire of claim 2, wherein the interrupted surface is defined by a plurality of parallel ridges oriented parallel to a longitudinal axis of the asymmetric TIR lens.

7. The luminaire of claim 1, wherein the elongate body is linear.

8. The luminaire of claim 1, wherein the elongate body is curved.

9. A method of installing a luminaire, comprising providing the luminaire of claim 1, and installing the luminaire in an orientation wherein the first elongate planar surface is oriented toward a wall to be illuminated.

10. The method of claim 9, wherein the second, uninterrupted elongate planar surface is oriented toward a location where an intended observer of the wall illumination is to be located so that the intended observer is unable to discern where light from the fixture is originating from.

11. The luminaire of claim 1, wherein the luminaire is a surface wash fixture.

12. The luminaire of claim 1, wherein the luminaire is a wall wash fixture.

* * * * *